(12) United States Patent
Hartwig et al.

(10) Patent No.: US 11,073,501 B2
(45) Date of Patent: Jul. 27, 2021

(54) SYSTEM AND METHOD FOR INSPECTING PARTS USING DYNAMIC RESPONSE FUNCTION

(71) Applicant: Honeywell Federal Manufacturing & Technologies, LLC, Kansas City, MO (US)

(72) Inventors: Troy Juan Hartwig, Kansas City, MO (US); Benjamin Ross Brown, Kansas City, MO (US); David Soine, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 16/577,001

(22) Filed: Sep. 20, 2019

(65) Prior Publication Data

US 2020/0057030 A1 Feb. 20, 2020

Related U.S. Application Data (63) Continuation-in-part of application No. 14/941,258, filed on Nov. 13, 2015, now Pat. No. 10,444,110.

(51) Int. Cl.
*G01N 29/24* (2006.01)
*G01N 29/12* (2006.01)
*B33Y 40/00* (2020.01)
*G01N 29/44* (2006.01)

(52) U.S. Cl.
CPC .......... *G01N 29/2418* (2013.01); *B33Y 40/00* (2014.12); *G01N 29/12* (2013.01); *G01N 29/4436* (2013.01)

(58) Field of Classification Search
CPC .......... G01N 29/2418; G01N 29/4436; G01N 29/043; G01N 29/12; B33Y 40/00; B33Y 50/00; B33Y 50/02; B33Y 10/00; B33Y 30/00
See application file for complete search history.

(56) References Cited

U.S. PATENT DOCUMENTS

| | | | |
|---|---|---|---|
| 6,583,381 B1 * | 6/2003 | Duignan ............ | B23K 15/0006 219/121.69 |
| 10,035,304 B2 * | 7/2018 | Reinarz ................. | B33Y 50/02 |
| 10,464,168 B2 * | 11/2019 | Matthews ............. | B23K 9/124 |
| 10,744,598 B2 * | 8/2020 | Hall ..................... | B23K 26/082 |

(Continued)

*Primary Examiner* — Helen C Kwok
(74) *Attorney, Agent, or Firm* — Hovey Williams LLP (57) ABSTRACT

A system and method for the non-destructive testing of additively manufactured parts. An input mechanism excites with an excitation force (e.g., a vibration) an additive manufacturing build structure, which includes a part on a build platform, to induce a dynamic response in the part. An output mechanism (e.g., a non-contact transducer) senses the induced dynamic response in the part. A processor determines and examines the relationship between the response and excitation to identify an indication of a defect in the part, and communicates an alert if the indication is identified. The processor may compare the phase, magnitude, coherence, or time delay of the relationship to a reference relationship and/or may compare the modal frequency or the modal damping to a reference to identify a deviation greater than a pre-established threshold.

16 Claims, 5 Drawing Sheets

(56) References Cited

U.S. PATENT DOCUMENTS

| | | | |
|---|---|---|---|
| 10,747,202 B2* | 8/2020 | Blom | G01B 11/285 |
| 2002/0166896 A1* | 11/2002 | Mazumder | B33Y 10/00 |
| | | | 235/487 |
| 2003/0178395 A1* | 9/2003 | Duignan | B23K 15/0086 |
| | | | 219/121.68 |
| 2010/0125356 A1* | 5/2010 | Shkolnik | G06T 5/006 |
| | | | 700/98 |
| 2016/0325541 A1* | 11/2016 | Lavrentyev | B23K 26/342 |
| 2017/0028703 A1* | 2/2017 | Xu | G01N 29/043 |
| 2017/0144250 A1* | 5/2017 | Gold | B23K 26/144 |
| 2017/0146488 A1* | 5/2017 | Gold | B29C 64/393 |
| 2017/0146489 A1* | 5/2017 | Redding | G01N 29/043 |
| 2017/0266727 A1* | 9/2017 | Nishino | G01N 21/1702 |
| 2018/0264590 A1* | 9/2018 | Goldfine | B23K 26/1224 |
| 2019/0234908 A1* | 8/2019 | Meile | G01N 29/4472 |
| 2019/0323951 A1* | 10/2019 | Gold | B33Y 30/00 |
| 2020/0001541 A1* | 1/2020 | Eiriksson | B29C 64/124 |
| 2020/0086567 A1* | 3/2020 | Salem | B29C 64/241 |
| 2020/0147725 A1* | 5/2020 | Gold | B33Y 30/00 |
| 2020/0147867 A1* | 5/2020 | Gold | B33Y 50/00 |
| 2020/0166482 A1* | 5/2020 | Gold | B29C 64/25 |
| 2020/0189194 A1* | 6/2020 | Spears | B33Y 50/00 |
| 2020/0230745 A1* | 7/2020 | Komsta | B23K 26/03 |
| 2020/0238624 A1* | 7/2020 | Dubelman | B29C 64/393 |
| 2020/0262139 A1* | 8/2020 | Murao | B29C 64/218 |

* cited by examiner

SYSTEM AND METHOD FOR INSPECTING PARTS USING DYNAMIC RESPONSE FUNCTION

CROSS-REFERENCE TO RELATED APPLICATIONS

The current patent application is a continuation-in-part patent application claiming priority benefit, with regard to all common subject matter, to U.S. patent application Ser. No. 14/941,258, entitled "SYSTEM AND METHOD FOR INSPECTING PARTS USING FREQUENCY RESPONSE FUNCTION", and filed Nov. 13, 2015. The earlier-filed patent application is incorporated by reference, in its entirety, into the current document.

STATEMENT REGARDING FEDERALLY-SPONSORED RESEARCH OR DEVELOPMENT

This invention was made with Government support under Contract No.: DE-NA0000622 awarded by the United States Department of Energy/National Nuclear Security Administration. The Government has certain rights in the invention.

FIELD

The present invention relates to systems and methods for testing additively manufactured parts. More particularly, the present invention concerns a system and method for the non-destructive testing of additively manufactured parts.

BACKGROUND

Some parts are produced using additive manufacturing processes (e.g., three-dimensional printing) rather than traditional "subtractive" manufacturing process. Manufacturers employing additive processes desire effective and reliable testing methods to ensure quality control and to quantify the quality of parts. The quality and acceptability of additively manufactured parts may depend on various process parameters. For example, in selective laser melting (SLM) or electron beam melting (EBM), critical process parameters include powder characteristics and equipment setup parameters. In subtractive processes, material properties may be assessed based on samples of the bulk material from which the parts are fabricated. In additive processes, material properties may depend on the equipment setup parameters, such as scan speed and beam power. Therefore, the material properties of each additively manufactured part may be unique because density, microstructure, and mechanical properties are dependent on both powder characteristics and process parameters. Powder can be inspected, and process parameters can be specified, but determining their cumulative effect on a part's material properties requires destructive testing of the part to confirm those properties. There are currently no suitable non-destructive tests to confirm the material properties of individual additively manufactured parts.

Resonant inspection techniques have been used to inspect parts produced by machining, casting, forging, and powered metallurgy processes. The parts are excited through direct contact, such as from impact hammers or piezoelectric actuators, and the response is measured with a microphone or with a direct contact piezoelectric actuator. The acceptability of an individual part is be determined by comparing the peaks in a frequency spectrum of the response to those in a reference spectrum, wherein deviations in absolute frequency, relative frequencies, or peak amplitudes may be considered evidence of a defect. These techniques rely on contact with the parts being tested, either through impact by a hammer or contact with a piezoelectric transducer for excitation and response measurements. Such direct contact with the parts can directly affect the parts' responses and undermine the test results. Furthermore, because prior art processes input energy directly into the parts, the processes must be adjusted for the size and shape of each part being tested, which can lower efficiency.

Prior art testing methods rely solely on the frequency and amplitude of the response (or relative frequency and amplitude). As a result, they may be insufficiently sensitive to highly damped modes or modes with low radiation efficiency, which may undermine their ability to discriminate between acceptable and unacceptable parts. Also, prior art techniques use ultrasonic transducers which inherently have very little displacement capability, and therefore have very little power at low frequency. Ultrasonic transducers are only able to excite high frequency modes in parts and are not able to excite or detect low frequency modes, even though low frequency modes are likely to be most affected by the types of defects typically found in additively manufactured parts. Additionally, exciting and/or measuring parts through contact with ultrasonic transducers, which generally require acoustic coupling, adds to system damping.

This background discussion is intended to provide information related to the present invention which is not necessarily prior art.

SUMMARY

Embodiments of the present invention solve the above-described and other problems and limitations by providing a system and method for the non-destructive testing of one or more additively manufactured parts. In a first embodiment of the present invention, a system for the non-destructive testing of one or more parts manufactured using an additive manufacturing process may broadly comprise an input mechanism, an output mechanism, and a processing element. The input mechanism may be configured to excite with an excitation force an additive manufacturing build structure, which includes a build platform on which the one or more parts are located to induce a dynamic response in the one or more parts. The output mechanism may be configured to sense the induced dynamic response in the one or more parts. The processing element may be configured to determine the relationship between the excitation force and the dynamic response, to identify an indication of a defect in the one or more parts, and to electronically communicate an alert if the indication of the defect is identified.

In a second embodiment of the present invention, a method for the non-destructive testing of one or more parts manufactured using an additive manufacturing process may broadly comprise the following steps. An additive manufacturing build structure comprising a build platform on which the one or more parts are located may be excited by an excitation force to induce a dynamic response in the one or more parts. The induced dynamic response in the one or more parts may be sensed with an output mechanism. The relationships between the excitation force and the dynamic response may be determined with an electronic processing element to identify an indication of a defect in the one or more parts, and an alert may be electronically communicated if the indication of the defect is identified.

Various implementations of the foregoing embodiments may include any one or more of the following features. A plurality of parts located on the additive manufacturing build platform may be tested simultaneously. The defect in the one or more parts may be, for example, porosities, voids, unfused powders, dimensional variations in parts, non-homogeneity in powder, improper microstructure, or cracks. The excitation force may be, for example, impulsive vibrations, a periodic waveform vibration, swept sinusoid vibrations, or random input vibrations. Exciting the additive manufacturing build structure may include inputting the excitation force directly to the build platform so as to introduce the excitation force indirectly to the one or more parts located on the build platform or it may include inputting the excitation force directly into the part being built. External damping imparted to the one or more parts may be minimized, including minimizing one or more forms of friction that might otherwise dissipate energy. The determined relationships may include a frequency response function, a coherence function, an autocorrelation function, a cross-correlation function, an auto-power spectrum, or a cross-power spectrum. These relationships may be further processed to estimate modal parameters, such as modal frequencies and modal damping, or to estimate the internal structural damping of the part. Examination of the relationships for identification of defects may include comparing a phase, a relative magnitude spectrum, a coherence spectrum, or a time delay between the output and the input to a reference relationship, or by comparing modal frequencies and modal damping or internal damping to reference values. The indication of the defect may be identified as a deviation of the determined relationship or parameter from the reference by an amount that is greater than a pre-established threshold. The pre-established threshold may be created by intentionally manufacturing a defective part with a known defect using the additive manufacturing process, examining the sensed induced frequency response of the defective part to identify the indication of the known defect, and basing the pre-established threshold on the identified indication. Additionally or alternatively, the pre-established threshold may be created using modeling and simulation.

This summary is not intended to identify essential features of the present invention, and is not intended to be used to limit the scope of the claims. These and other aspects of the present invention are described below in greater detail.

BRIEF DESCRIPTION OF THE DRAWING FIGURES

Embodiments of the present invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly characterized, the present invention provides a system and method for the non-destructive testing of additively manufactured parts by exciting an additive manufacturing build structure to induce a dynamic response in the parts located on the build platform, sensing the vibration-induced dynamic response, and examining a relationship between the dynamic response and the excitation force to detect a defect in the parts. In implementations, the testing may be performed in-situ or near in situ.

A part may be directly excited, or it may be indirectly excited by introducing vibration excitation directly into the build platform, thereby avoiding direct contact with the part and avoiding introducing external damping or other influences on the part's response. Exciting the build platform may be accomplished using impulsive vibration (e.g., by application of an impact hammer to the build platform), a periodic waveform vibration, swept sinusoid vibration, or random input vibrations applied to the additive manufacturing build platform so as to generate the dynamic response. Sensing the dynamic frequency response of the parts may be accomplished using non-contact motion transducers. Using non-contact motion transducers facilitates detecting modes that are highly damped and modes with low radiation efficiency, and again avoiding introducing external damping. Alternatively, the dynamic response may be measured with an accelerometer, acoustic or ultrasonic transducer.

The part's response to the vibration excitation may be determined by the part's geometry (e.g., shape, dimensions) and material properties (e.g., density, elasticity, internal damping). Defects in a part produced by an additive manufacturing process (such as SLM or EBM) may include porosity, voids, unfused powder, improper microstructure, and/or cracks. Such defects may effect the dynamic response of the vibrationally excited part, and such effects may include the frequency at which the part resonates, the amplitude of the response at resonance, the phase of the response relative to the excitation, the coherence function, and/or the time delay. In particular, the phase of the response may be sensitive to internal damping, and the types of defects occurring during additive manufacturing may be likely to affect the internal damping of the material.

The frequency response function (FRF) may be computed between the known input excitation force and the output dynamic response computed in the frequency domain. The frequency, amplitude, and phase of the part may be compared to a reference FRF measured in a part having known quality, or predicted from modelling and simulating acceptable parts. For example, peaks in the measured FRF for the newly created part may be compared to peaks in the reference FRF for a known acceptable part. Deviation of the measured FRF from the reference FRF by more than an allowable threshold may be interpreted as evidence of a defect and, potentially, an unacceptable part.

In one implementation, the structural integrity of the parts may be directly measured using a phase relationship between the input force and the measured response (i.e., the phase of the frequency response function). In particular, the additive manufacturing build structure may be vibrated and the amplitude and phase of the frequency response function may be determined and used to assess the structural integrity of the parts. Deviations of the actual response from the reference response which are greater than a pre-established allowable threshold may be used to identify defective parts. The allowable threshold may be pre-established by intentionally deviating additive manufacturing process parameters from ideal settings in order to produce reference part specimens with known unacceptable properties, and measuring their actual frequency response characteristics. Additionally, or alternatively, the allowable threshold may be pre-established using modelling and simulation of acceptable parts.

Figure 1:
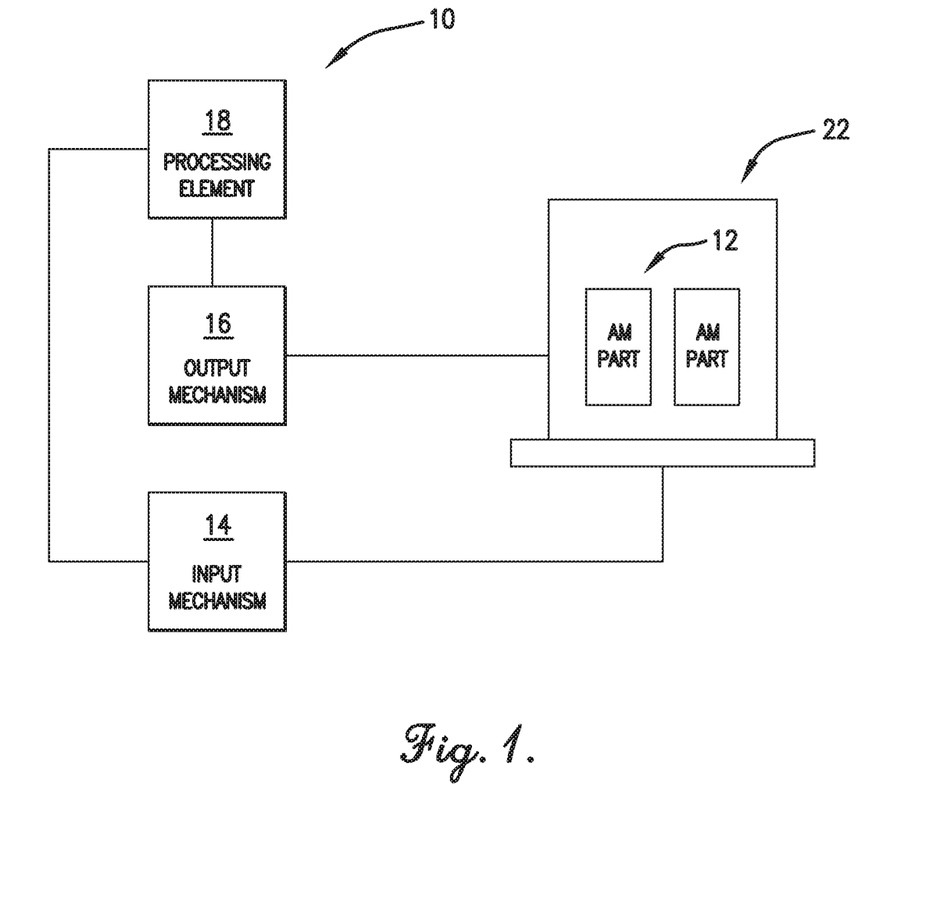
FIG. 1 is a block diagram of a system constructed in accordance with an embodiment of the present invention.
Figure 2:
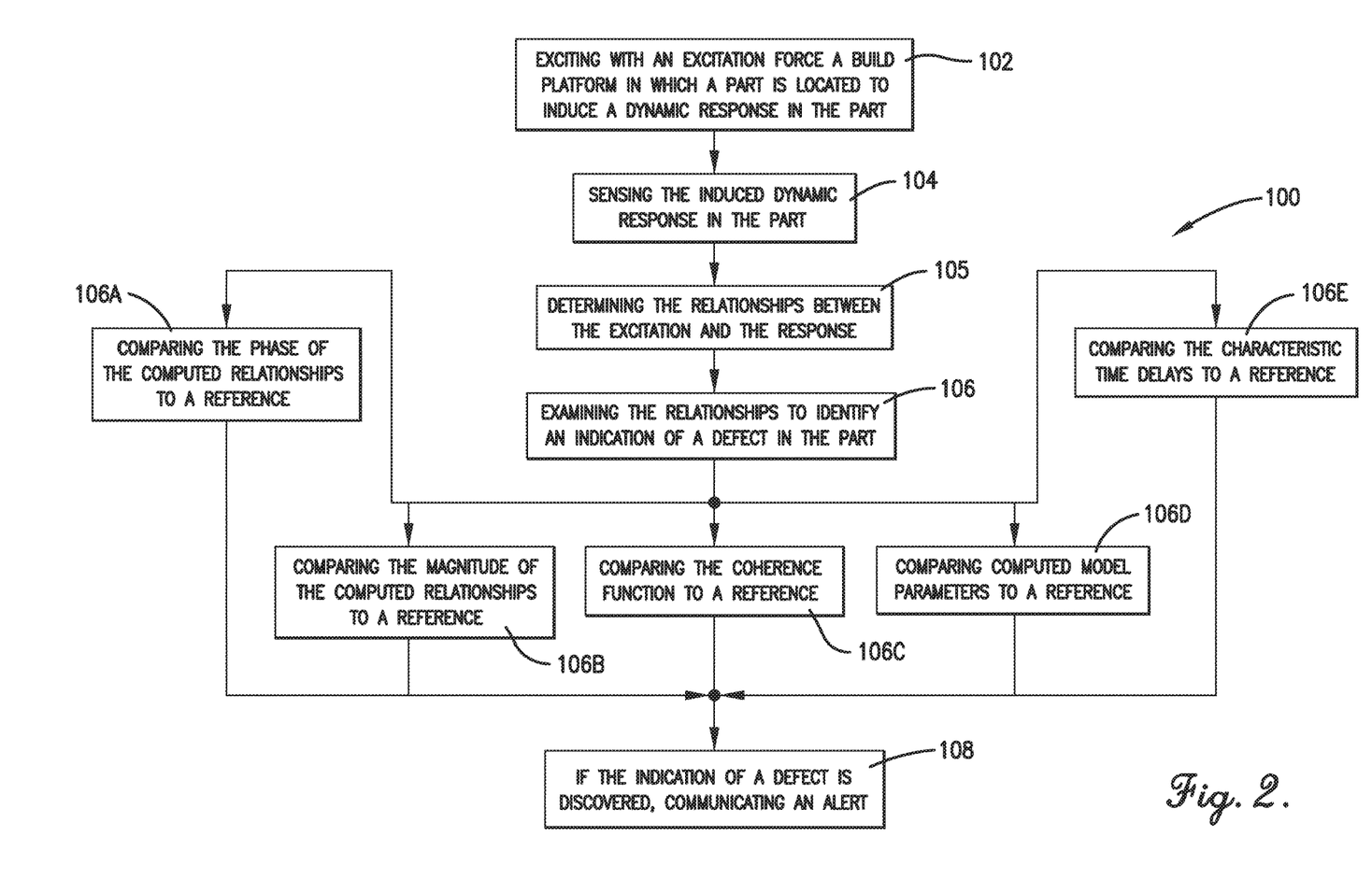
FIG. 2 is a flowchart of a method practiced in accordance with an embodiment of the present invention.

Referring to FIGS. 1 and 2, a system 10 and method 100 for the non-destructive testing of one or more parts 12 manufactured using an additive manufacturing process may broadly comprise an input mechanism 14, an output mechanism 16, and a processing element 18 configured to perform as follows. The input mechanism 14 may be configured to excite with an excitation force the part 12, or an additive manufacturing build platform 22 on which the part 12 is located to induce a dynamic response in the part 12, as shown in step 102. The excitation force may be, for example, impulsive vibrations, a periodic waveform vibration, swept sinusoid vibrations, and random input vibrations. The input mechanism 14 may excite the build platform 22 by introducing the excitation force directly to the build platform 22 so as to introduce the excitation force indirectly to the part 12 located on the build platform 22.

The output mechanism 16 may be configured to sense the induced dynamic response in the part 12, as shown in step 104. The output mechanism 16 may directly or indirectly measure a mechanical or other response of the part 12. The output mechanism 16 may be a non-contact transducer. The processing element 18 may be configured to determine one or more relationships between the dynamic response output and the excitation force input, as shown in step 105. The processing element 18 may be configured to examine the relationship between the dynamic response output and the excitation force input to identify an indication of a defect in the part 12, as shown in step 106, and to communicate an alert if the indication of the defect is identified, as shown in step 108. The processing element 18 may be any suitable electronic or other device configurable to perform the functions described herein. The defect may in the form of porosities, voids, unfused powders, dimensional variations, non-homogenous powders, improper microstructure, and/or cracks. If the indication of a defect is discovered, the processing element 18 may communicate an alert so that further action (e.g., further testing) may be taken, as shown in step 108.

In one implementation, the processing element 18 may be configured to compare a phase of the determined relationship to a reference to identify the indication of the defect, as shown in step 106A.

In another implementation, the processing element 18 may be configured to compare a magnitude of the determined relationship to a reference to identify the indication of a defect, as shown in step 106B. The processing element 18 may be further configured to identify the indication of the defect in an internal damping characteristic of the part 12.

In yet another implementation, the processing element 18 may be configured to compare the coherence function between the output and the input to a reference to identify the indication of a defect, as shown in step 106C, compare the determined modal parameters to a reference, as shown in 106D, or compare the characteristic time delays to a reference, as shown in step 106E.

The pre-established reference may be established by intentionally manufacturing a defective part with a known defect using the additive manufacturing process, examining the determined relationships to identify the indication of the known defect, and basing the pre-established reference and detection threshold on the identified indication. Additionally or alternatively, the pre-established references may also be based on models and simulations of a reference part.

The system 10 and method 100 may be used to inspect one part at a time or to simultaneously inspect a plurality of parts located on the build platform. The system 10 and method 100 may be used as or as a step in an initial or intermediate screening process to identify problems in the additive manufacturing process, and if a problem is found, the parts may then be subjected to a more extensive inspection. The system 10 and method 100 may be used to test a part before it is removed from the build platform. For example, the build platform itself may be installed in a test apparatus that implements the present invention. The system 10 and method 100 may be used to test a part in-situ at any time during the build process, either at discrete points in the build process or continuously throughout the build.

Applications of embodiments of the present invention may include inspecting metal parts produced using additive manufacturing processes in, e.g., the Nuclear Security Enterprise and/or the defence and aerospace industry. Additional applications include inspecting other high precision/high quality components, including those produced using conventional machining techniques, including non-metallic parts. Some such parts may be supported during impact to minimize the amount of damping imparted to the system.

Embodiments of the present invention may be adopted into one or more commonly accepted test standards, such as ASTM WK47031, New Guide for Nondestructive Testing of Additive Manufactured Metal Parts Used in Aerospace Applications; F2971-13, Standard Practice for Reporting Data for Test Specimens Prepared by Additive Manufacturing; F3122-14 Standard Guide for Evaluating Mechanical Properties of Metal Materials Made via Additive Manufacturing Processes; and ISO I ASTM52921-13, Standard Terminology for Additive Manufacturing-Coordinate Systems and Test Methodologies.

The present invention provides several advantages over prior art processes. Unlike prior art processes, the present invention may not simply evaluate the amplitude of the measured dynamic response, but rather it may evaluate the relationships between the output responses and the input excitation. The phase of the determined relationships is sensitive to the damping in the system, the coherence function is sensitive to non-linearity in the system, and the cross-correlation function is sensitive to reflections and unequal signal paths in the system. None of these measures are available to a system which analyses the output response without considering the input excitation. Failure modes anticipated in additively manufactured parts are expected to affect internal damping, non-linearity and reflections. In addition, the present invention may minimize or limit the amount of external damping imparted to the part being tested, including minimizing various forms of friction that might otherwise dissipate energy. This may be accomplished, for example, by supporting the build platform on air bearings, and/or using a non-contact transducer as the output mechanism. Using a measure sensitive to system damping and controlling external damping facilitates discriminating between good parts and bad parts based on system damping.

Unlike prior art processes, the present invention may directly measure the mechanical response of the part, not the radiated acoustic field, so that modes with low radiation efficiency will still be detected, and the measurements can be performed in a production environment in the presence of high levels of background noise.

Unlike prior art processes, the present invention may not use ultrasonic transducers. Ultrasonic transducers inherently have very little displacement capability and subsequently have very little power at low frequency. Ultrasonic transducers are only able to excite high frequency modes in parts and are not able to excite or detect low frequency modes, even though low frequency modes are likely to be most affected by the types of defects typically found in additively manufactured parts. Furthermore, exciting and/or measuring parts through contact with ultrasonic transducers, which generally require acoustic coupling, adds to system damping.

Unlike prior art processes, the present invention may not input energy directly into the parts being tested. Because prior art processes input energy directly into the parts, those processes must be adjusted for the size and shape of each part being tested. The present invention may input energy directly into the standard build plate used in additive manufacturing, which means that any part produced on a particular additive manufacturing machine can be tested without requiring any adjustments to excite the plate.

Figure 3:
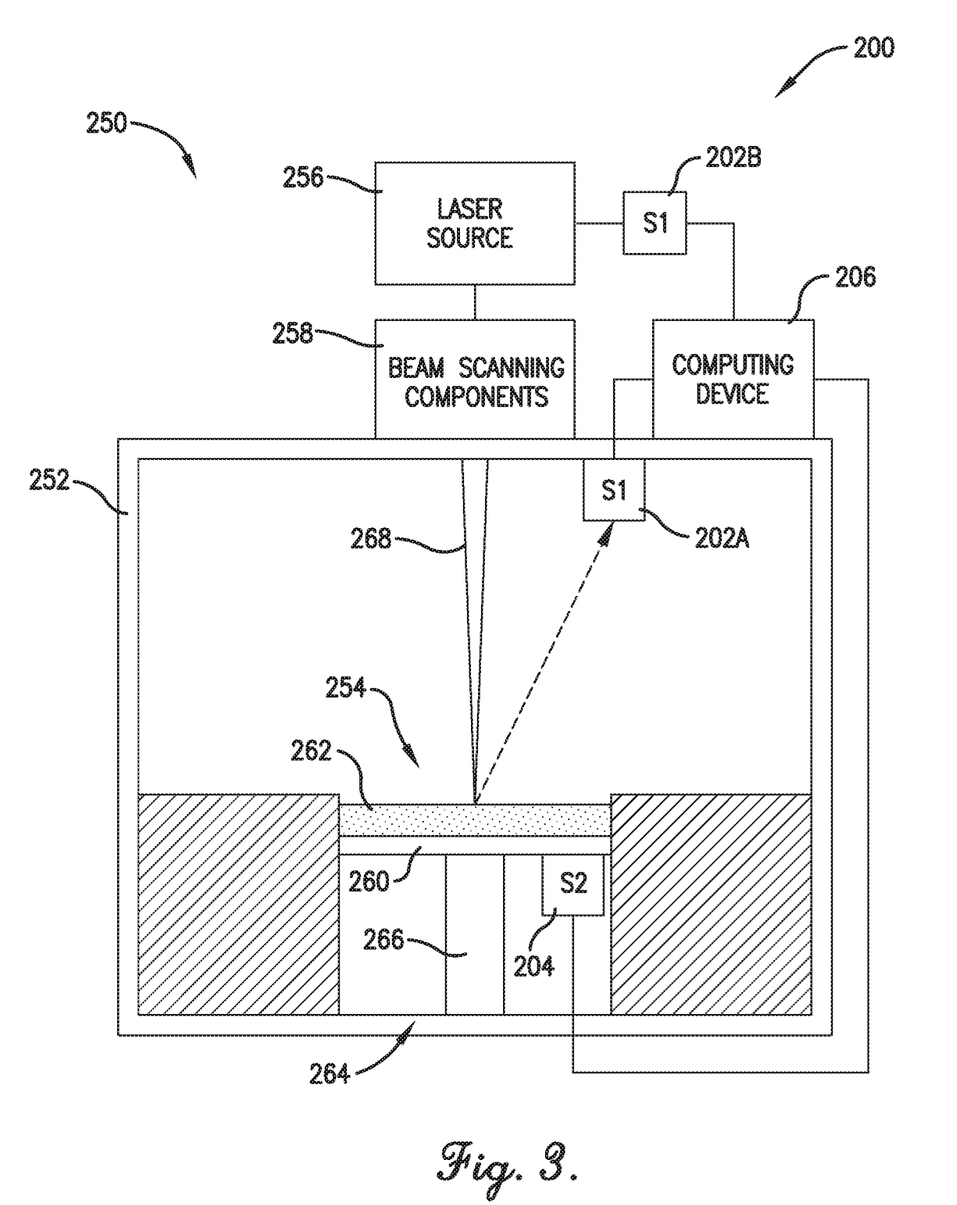
FIG. 3 is a schematic block diagram of another embodiment of a system for determination of a quality of a part being built using a laser-based additive manufacturing system.

Referring to FIG. 3, another embodiment of the present invention provides a second quality determination system 200 for non-destructive testing of parts manufactured using an additive manufacturing (AM) process. Specifically, the quality determination system 200 is best utilized with a laser powder bed fusion AM process wherein a laser is used to melt metal powder to build parts. The quality determination system 200 may be utilized to determine, or verify, a quality of the build while the build is occurring by measuring an excitement or stimulation of the part as it is being built. The excitement is provided by the laser, as described in more detail below. The quality determination system 200 interfaces with an AM system 250 that includes a build chamber 252, a powder bed 254, a laser source 256, and beam scanning components 258.

The build chamber 252 generally provides an enclosed space in which parts can be built. The build chamber 252 typically includes four side walls connected to one another with a top wall and a bottom wall, each connected to the side walls. One or more of the side walls may have resealable openings to provide access to the interior.

The powder bed 254 includes a build plate 260 which retains the raw material, meltable metal powder 262. The build plate 260 may have a thin two-dimensional shape, such as circular, oval, rectangular, square, octagonal, etc., and may be constructed from metals or similar hardened materials. Various embodiments of the build plate 260 may include a non-stick coating on an upper surface thereof. The combination of the build plate 260 and the part that is being constructed or formed on the build plate 260 are considered a "build structure". The build plate 260 may be positioned within a build tank 264 located on the bottom wall of the build chamber 252. In addition, the build plate 260 may be coupled to an actuator 266 that progressively lowers the build plate 260 during the AM build process.

The metal powder 262 is melted to build the part and may be a powdered form of one or more metals, such as aluminum, copper, gold, silver, titanium, cobalt, chrome, carbon steel, stainless steel, or the like, or alloys, such as aluminum 6061, aluminum 7075, titanium T6Al4V, stainless steel 304L, and so forth.

The laser source 256 provides a laser beam 268 that is used to melt the metal powder 262. The laser source 256 may include any one of a number of types of lasers, such as $CO_2$ lasers, Nd:YAG lasers, Yb-fiber lasers, and so forth. The laser source 256 may generate a sequence or series of pulses of the laser beam 268 at a pulse frequency or pulse repetition rate wherein each pulse has an amplitude and a pulse width or duration.

The beam scanning components 258 generally guide the laser beam 268 to follow a path in the metal powder 262 to build each layer of the part. The beam scanning components 258 may reflect or refract the laser beam 268 as necessary to follow the path and may include mirrors, lens, splitters, prisms, and the like along with motors, actuators, and electronic circuitry.

The AM build process may be implemented as follows. The powder bed 254 is filled with a first layer of metal powder 262. The laser beam 268 scans across the metal powder 262 in the path required to build the current layer of the part. As the laser beam 268 strikes the metal powder 262, it creates a melt pool of molten powder in the spot of laser beam 268 contact. As the laser beam 268 moves along the scan path, the melt pool moves with it. The metal powder 262 that had been melted then fuses, cools, and solidifies as the laser beam 268 moves away. Once the laser beam 268 has scanned the entire path for the first layer of the part, the build plate 260 is lowered and the next layer of metal powder 262 is deposited onto the powder bed 254. The laser beam 268 scans the entire path of the current layer of the part and these steps are repeated until the last layer of the part is built. At this point, the part is complete.

It has been found that during the AM build process, energy from the laser beam 268 that is absorbed near the surface of the metal powder 262 is transferred through the powder layer by conduction and/or advection. The laser beam 268 delivers a force to the metal powder 262 that vaporizes the surface of the melt pool and creates a recoil pressure field above the melt pool. The recoil pressure combined with Marangoni convection determines the melt pool dynamics, which in turn, determines the quality of the part as it is being built. The recoil pressure being below a lower threshold leads to inadequate fusion of the metal powder 262. The recoil pressure being above an upper threshold leads to hole formation, such as key holing, and gas porosity.

The force of the laser beam 268, specifically a laser beam 268 that is pulsed at a particular frequency, amplitude, and pulse width, also excites or stimulates the metal powder 262 that is being melted and fused. An exemplary frequency may be approximately 10 kiloHertz (kHz). An exemplary amplitude may be approximately 2 millinewtons (mN). An exemplary pulse width may be approximately 90 microseconds (μs). The excitation causes a structural response, in the form of vibrations, of the part as it is being built. The vibrations may occur at one or more frequencies. An acceleration response of the build structure as a function of frequency is given by the following equation:

$$a(f)=RF(f) \times IF(f) \qquad \text{EQ. 1}$$

wherein RF is a response function in the complex domain as a function of frequency and IF is the input force from the laser beam 268 as a function of frequency. In certain situations, the RF is considered a frequency response function (FRF). Therefore, the RF of the part being built is given by the following equation:

$$RF(f)=a(f)/IF(f) \qquad \text{EQ. 2}$$

When the RF relates the input force to the acceleration response it is termed the accelerance. Other RF's can be computed to relate other characteristics of input and response, such as mobility (which equals velocity/force), impedance, etc.

The RF has amplitude, frequency, and phase characteristics that are unique to the specifications of the part that is being built. That is, the RF varies according to the shape, size, material, and so forth of the part. In addition, the RF varies according to the quality of the part. A low-defect part has a different RF from a high-defect part. Accordingly, analysis of the RF can be used to determine the quality of the part.

Other relationships can also be computed between the input and output signal including coherence functions, autocorrelation functions, a cross-correlation function, or a cross-power spectrum. Like the FRF, each of these response functions has amplitude, frequency, and phase characteristics that are unique to the specifications of the part that is being built and can be used to determine the quality of the part.

The quality determination system 200 to determine the quality of the part while the build is occurring broadly comprises a first sensor 202, a second sensor 204, and a computing device 206, as shown in FIG. 3. The quality determination system 200 is utilized when the laser source 256 is able to melt and fuse the metal powder 262 to build the part and properly excite the part to elicit a response from the part.

The first sensor 202 generally senses and/or measures a characteristic associated with the laser beam 268 or the laser source 256. In a first embodiment, the first sensor 202A senses and/or measures optical characteristics of the laser beam 268 as it is exciting the metal powder 262. The first sensor 202A may be positioned in the build chamber 252 and may receive scattered light, reflections, or incidental light or radiation from the laser beam 268 as it is exciting the metal powder 262. The first sensor 202A may include photosensing devices such as photodiodes, photoconductors, charge-coupled devices, photomultiplier tubes, phototransistors, photoresistors, or the like, or combinations thereof. In a second embodiment, the first sensor 202B senses and/or measures electrical characteristics of the laser source 256. That is, the first sensor 202B may receive output from the electric power supply which provides electric power to the laser source 256. For example, the first sensor 202B may receive or sense an electric voltage or electric current from the electric power supply while it is powering the laser source 256. Thus, the sensed voltage or current is proportional to, corresponds to, or correlates to the characteristics, such as power, energy, amplitude, and/or frequency, of the laser beam 268 that excites the metal powder 262. The first sensor 202B may include electronic circuitry such as amplifiers, filters, analog-to-digital converters (ADCs), or the like, or combinations thereof. In certain situations, the quality determination system 200 may include both embodiments of the first sensor 202A, 202B. The first sensor 202 generates or outputs a first electronic signal that includes voltage or current levels or digital data values which correspond to, are proportional to, or vary according to the characteristic being sensed.

The second sensor 204 generally senses a characteristic associated with the part being built by sensing a characteristic of the part on the build plate 260. Typically, the second sensor 204 senses motion of, or forces acting on, the build plate 260, such as acceleration, vibration, etc. The second sensor 204 may include an accelerometer, a laser Doppler vibrometer, a force transducer, or the like, or combinations thereof. The second sensor 204 may be positioned in contact with, or attached to, a bottom surface of the build plate 260 or it may be positioned in contact with the part under construction (e.g. using a laser Doppler vibrometer to target the exposed top surface of the part). The second sensor 204 generates or outputs a second electronic signal that includes voltage or current levels or digital data values which correspond to, are proportional to, or vary according to the characteristic being sensed.

The computing device 206 generally determines a relationship between the input excitation from the laser source 256 and the output response of the part being built and determines whether the relationship matches the expected relationship for a part of high quality. The computing device 206 may be embodied by workstation computers, desktop computers, laptop computers, palmtop computers, notebook computers, tablets or tablet computers, or the like. The computing device 206 may include a display, input/output devices such as a keyboard, a mouse, etc., a communication element, a memory element, and a processing element.

The communication element generally allows the computing device 206 to communicate with other computing devices, external systems, networks, and the like. The communication element may establish communication wirelessly by utilizing radio frequency (RF) signals and/or data that comply with communication standards. The communication element may additionally or alternatively establish communication through electrically conductive wires or through optical fiber cables.

The memory element may be embodied by devices or components that store data in general, and digital or binary data in particular, and may include exemplary electronic hardware data storage devices or components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element may be embedded in, or packaged in the same package as, the processing element. The memory element may include, or may constitute, a non-transitory "computer-readable medium". The memory element may store the instructions, code, code statements, code segments, software, firmware, programs, applications, apps, services, daemons, or the like that are executed by the processing element. The memory element may also store data that is received by the processing element or the device in which the processing element is implemented. The processing element may further store data or intermediate results generated during processing, calculations, and/or computations as well as data or final results after processing, calculations, and/or computations. In addition, the memory element may store settings, data, documents, sound files, photographs, movies, images, databases, and the like.

The processing element may comprise one or more processors. The processing element may include electronic hardware components such as microprocessors (single-core or multi-core), microcontrollers, digital signal processors (DSPs), field-programmable gate arrays (FPGAs), analog and/or digital application-specific integrated circuits (ASICs), or the like, or combinations thereof. The processing element may generally execute, process, or run instructions, code, code segments, code statements, software, firmware, programs, applications, apps, processes, services, daemons, or the like. The processing element may also include hardware components such as registers, finite-state machines, sequential and combinational logic, and other electronic circuits that can perform the functions necessary for the operation of the current invention. In certain embodiments, the processing element may include multiple computational components and functional blocks that are packaged separately but function as a single unit. The processing element may be in electronic communication with the other electronic components through serial or parallel links that include universal busses, address busses, data busses, control lines, and the like.

The computing device 206 may be operable, configured, or programmed to perform the following functions by utilizing hardware, software, firmware, or combinations thereof. The computing device 206 receives the first electronic signal from the first sensor 202 and the second electronic signal from the second sensor 204. From the first electronic signal, the computing device 206 determines, calculates, or derives a first variable quantity as a function of frequency, wherein the first variable quantity is an input force. This input force is the force from the laser beam 268 which causes the recoil pressure in the melt pool. The computing device 206 may perform a time-domain to frequency-domain conversion, such as a Fourier transform or a discrete Fourier transform, on the first electronic signal to determine, calculate, or derive the input force as a function of frequency. The time-domain to frequency-domain conversion may result in a first data set which includes a magnitude value (of the input force) for each one of a plurality of frequencies (or frequency bins). The computing device 206 may perform the conversion on a regular periodic basis or at selected time periods.

From the second electronic signal, the computing device 206 determines, calculates, or derives a second variable quantity as a function of frequency, wherein the second variable quantity is a response of the part on the build plate 260. The response of the part is the result of the laser beam 268 exciting or stimulating the metal powder 262 as the metal powder 262 is melted and fused. The computing device 206 may perform a time-domain to frequency-domain conversion, such as a Fourier transform or a discrete Fourier transform, on the second electronic signal to determine, calculate, or derive the response as a function of frequency. The time-domain to frequency-domain conversion may result in a second data set which includes a magnitude value (of the response) for each one of a plurality of frequencies (or frequency bins). The computing device 206 may perform the conversion on a regular periodic basis or at selected time periods.

The computing device 206 computes the response function using equation EQ. 2 or another complex domain relationship as a function of frequency. The resulting response function is a function of frequency and may be a data set which includes a magnitude and phase value for each one of a plurality of frequencies (or frequency bins). The computing device 206 may compute the response function on a regular periodic basis, or may compute the response function at selected time periods. The computing device 206 also compares the current response function with a predetermined response function dataset (representing a low-defect part) for the same time period during the AM build process. The computing device 206 may compare values of the current response function with values of the predetermined response function at every frequency (or frequency bin). Or, the computing device 206 may compare peak values of the current response function with peak values of the predetermined response function. Peak values of the current response function that occur at shifted frequencies compared with the predetermined response function may indicate a greater number of defects in the part. If there is one or more difference that is greater than a threshold, then the computing device 206 may record the difference and the time period during the AM build process. Alternatively, or additionally, the computing device 206 may use artificial intelligence, such as neural networks and the like, or deep learning techniques to analyze the current response function and determine the level of defects in the part. In some cases if the differences between the current response function and the predetermined response function are too great, then the AM build process may be halted and the part may be removed before completion. In other cases if the differences between the current response function and the predetermined response function are too great, then the part may be completed, but may be submitted for analysis. In still other cases if the differences between the current response function and the predetermined response function are too great, then the parameters of the AM build process, such as laser beam power, laser beam scan speed, laser beam pulse frequency, amplitude, and width, etc., may be adjusted to reduce the differences between the current response function and the predetermined response function.

With some embodiments of the AM system 250, the laser source 256 may not be configured to, or capable of, pulsing the laser beam 268 within the correct range of amplitude and frequency to excite or stimulate the part as it is being built. For example, for a particular part shape and size or particular material, the laser beam parameters (pulse frequency, amplitude, and width) that are required for melting and fusing the metal powder 262 may not be suitable to excite or stimulate the part so that a determination of the response function can be made. With such embodiments of the AM system 250, a third quality determination system 300 may be utilized.

Figure 4:
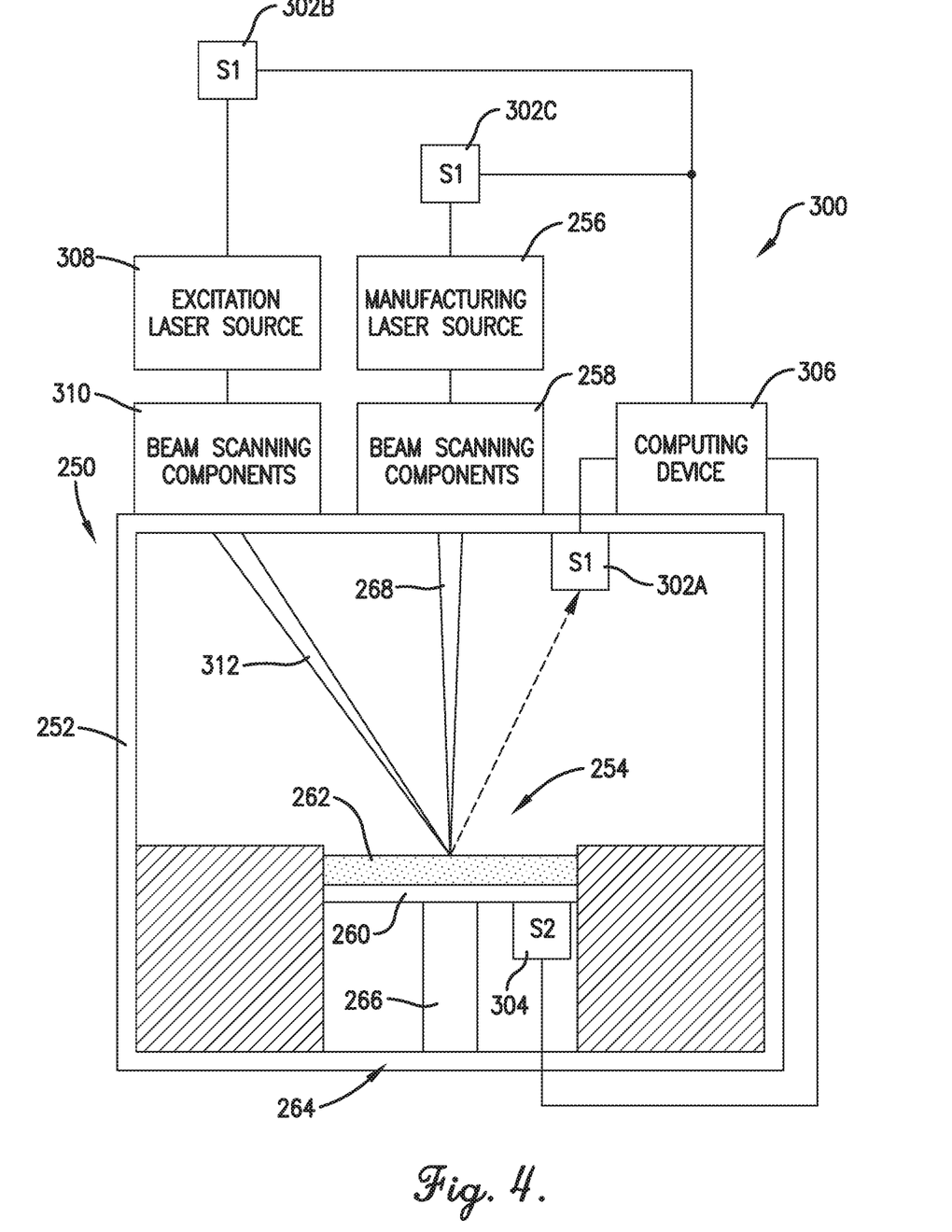
FIG. 4 is a schematic block diagram of yet another embodiment of a system for determination of a quality of a part being built using a laser-based additive manufacturing system.

The third quality determination system 300, as shown in FIG. 4, broadly comprises a first sensor 302, a second sensor 304, a computing device 306, an excitation laser source 308, and beam scanning components 310. The second sensor 304 and the computing device 306 are substantially similar to the first sensor 202, the second sensor 204, and the computing device 206 in structure and function.

The first sensor 302 includes the same structure and function as the first sensor 202 described above. A first embodiment of the first sensor 302A may be positioned in the build chamber 252. A second embodiment of the first sensor 302B may be positioned to sense and/or measure electrical characteristics of the excitation laser source 308. A third embodiment of the first sensor 302C may be positioned to sense and/or measure electrical characteristics of the manufacturing laser source 256. In certain situations, the first sensor 302 may include a combination of the embodiments.

The excitation laser source 308 and the beam scanning components 310 generate and control a laser beam 312 and are substantially similar to the laser source 256 and the beam scanning components 258 in structure and function. As mentioned above, the laser source 256 may not be configured to, or capable of, pulsing the laser beam 268 to excite the part. However, with the quality determination system 300, the excitation laser source 308 is capable of and configured to pulse the laser beam 312 with the proper pulse frequency, amplitude, and width to excite the part.

The quality determination system 300 operates much the same as the quality determination system 200. The first sensor 302 senses a characteristic from the laser beam 312, the manufacturing laser source 256, or the excitation laser source 308 and communicates a first electronic signal to the computing device 306. The second sensor 304 senses a characteristic from the build plate 260 and communicates a second electronic signal to the computing device 306. The computing device 306 receives the two electronic signals, computes the response function, and determines a difference between the current response function and a predetermined response function.

The beam scanning components 258 control the laser beam 268 to follow a path along the metal powder 262 to melt and fuse the metal powder 262 to build the part. The beam scanning components 310 may control the laser beam 312 to follow the same path at the same time as the laser beam 268. As a first alternative, the beam scanning components 310 may control the laser beam 312 to follow the same path as the laser beam 268 a little later in time. As a second alternative, the beam scanning components 310 may control the laser beam 312 to follow the same path as the laser beam 268 after the laser beam 268 has completed a layer of the part and before the laser beam 268 starts a new layer of the part. Typically, the laser beam 312 does not remelt the metal powder 262 that has already been melted and fused.

Figure 5:
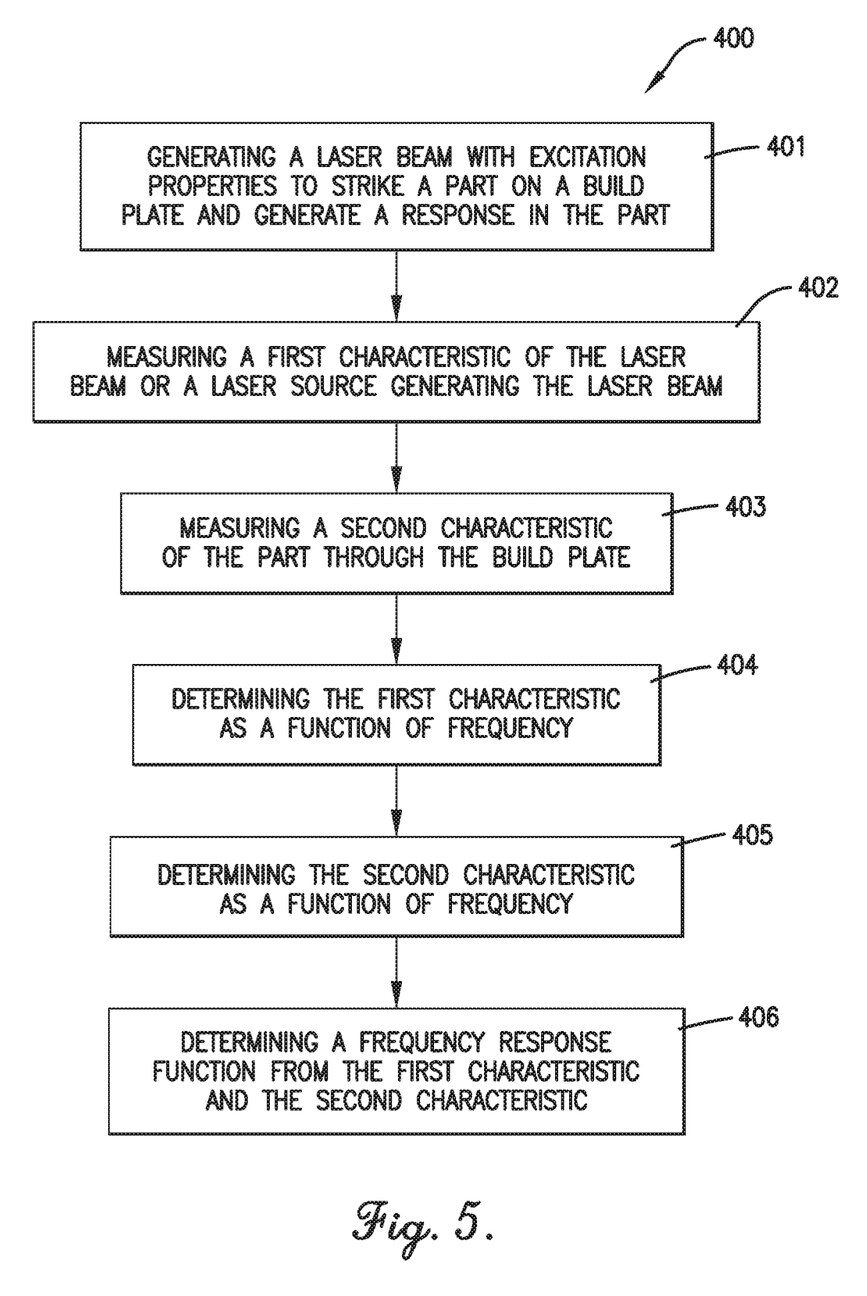
FIG. 5 is a flow diagram of at least a portion of the steps of a method for determination of a quality of a part being built using a laser-based additive manufacturing system.

FIG. 5 depicts a listing of at least a portion of the steps of an exemplary computer-implemented method 400 for determining a quality of a part built by an additive manufacturing process. The steps may be performed in the order shown in FIG. 5, or they may be performed in a different order. Furthermore, some steps may be performed concurrently as opposed to sequentially. In addition, some steps may be optional or may not be performed.

Referring to step 401, a laser beam 268, 312 with excitation characteristics is generated to strike a part on a build plate 260 and generate a response in the part. The laser beam 268, 312 is generated by the manufacturing laser source 256 or the excitation laser source 308. The excitation characteristics include pulse frequency, amplitude, pulse width, and the like. An exemplary frequency may be approximately 10 kiloHertz (kHz). An exemplary amplitude may be approximately 2 mN. An exemplary pulse width may be approximately 90 microseconds (µs). The laser beam 268, 312 strikes metal powder 262 that is positioned on the build plate 260 in an AM system 250. The laser beam 268, 312 may be configured to melt and fuse the metal powder 262 in order to build the part. But, importantly, the excitation from the laser beam 268, 312 causes a structural response, in the form of vibrations, of the part as it is being built.

Referring to step 402, a first characteristic of the laser beam 268, 312 or the laser source 256, 308 generating the laser beam 268, 312 is measured. The first sensor 202 may sense and/or measure optical characteristics of the laser beam 268 or electrical characteristics of the laser source 256, 308 as the laser beam 268, 312 excites the metal powder 262. The first sensor 202 may be positioned in the build chamber 252 to receive scattered light, reflections, or incidental light or radiation from the laser beam 268, 312 or may receive or sense an electric voltage or electric current from the electric power supply while it is powering the laser source 256, 308. The first sensor 202 generates or outputs a first electronic signal that includes voltage or current levels or digital data values which correspond to, are proportional to, or vary according to the characteristic being sensed.

Referring to step 403, a second characteristic of the part is measured through the build plate 260. The second sensor 204 generally senses a characteristic associated with the part being built by sensing a characteristic of the part through the build plate 260. The second sensor 204 is positioned in contact with, or attached to, a bottom surface of the build plate 260. The second sensor 204 generates or outputs a second electronic signal that includes voltage or current levels or digital data values which correspond to, are proportional to, or vary according to the characteristic being sensed.

Referring to step 404, the first characteristic as a function of frequency is determined. The computing device 206 receives the first electronic signal from the first sensor 202. From the first electronic signal, the computing device 206 determines, calculates, or derives an input force as a function of frequency. This input force is the force from the laser beam 268 which causes the recoil pressure in the melt pool. The computing device 206 may perform a time-domain to frequency-domain conversion, such as a Fourier transform or a discrete Fourier transform, on the first electronic signal to determine, calculate, or derive the input force as a function of frequency. The time-domain to frequency-domain conversion may result in a first data set which includes a magnitude value (of the input force) for each one of a plurality of frequencies (or frequency bins). The computing device 206 may perform the conversion on a regular periodic basis or at selected time periods.

Referring to step 405, the second characteristic as a function of frequency is determined. The computing device 206 receives the second electronic signal from the second sensor 204. From the second electronic signal, the computing device 206 determines, calculates, or derives an acceleration of the part through the build plate 260 as a function of frequency. The acceleration of the part is the result of the laser beam 268 exciting or stimulating the metal powder 262 as the metal powder 262 is melted and fused. The computing device 206 may perform a time-domain to frequency-domain conversion, such as a Fourier transform or a discrete Fourier transform, on the second electronic signal to determine, calculate, or derive the acceleration as a function of frequency. The time-domain to frequency-domain conversion may result in a second data set which includes a magnitude value (of the acceleration) for each one of a plurality of frequencies (or frequency bins). The computing device 206 may perform the conversion on a regular periodic basis or at selected time periods.

Referring to step 406, a frequency response function is determined from the first characteristic and the second characteristic. The computing device 206 computes the response function using equation EQ. 2 or another response function from the input and output signals. The resulting response function may be a data set which includes a magnitude and phase value for each one of a plurality of frequencies (or frequency bins). The computing device 206 may compute the response function on a regular periodic basis, or may compute the response function at selected time periods. The computing device 206 also compares the current response function with a predetermined response function dataset (representing a low-defect part) for the same time period during the AM build process. The computing device 206 may compare values of the current response function with values of the predetermined response function at every frequency (or frequency bin). Or, the computing device 206 may compare peak values of the current response function with peak values of the predetermined response function. Peak values of the current response function that occur at shifted frequencies compared with the predetermined response function may indicate a greater number of defects in the part. If there is one or more difference that is greater than a threshold, then the computing device 206 may record the difference and the time period during the AM build process. Alternatively, or additionally, the computing device 206 may use artificial intelligence, such as neural networks and the like, or deep learning techniques to analyze the current response function and determine the level of defects in the part. In some cases if the differences between the current response function and the predetermined response function are too great, then the AM build process may be halted and the part may be removed before completion. In other cases if the differences between the current response function and the predetermined response function are too great, then the part may be completed, but may be submitted for analysis. In still other cases if the differences between the current response function and the predetermined response function are too great, then the parameters of the AM build process, such as laser beam power, laser beam scan speed, laser beam pulse frequency, amplitude, and width, etc., may be adjusted to reduce the differences between the current response function and the predetermined response function.

Additional Considerations

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

1. A system for determination of a quality of a part being built using a laser-based additive manufacturing system, the system comprising:
    a first sensor configured to sense a characteristic of a laser beam or a laser source, the first sensor outputting a first electronic signal that includes electric voltage or current levels or digital data values which vary according to the characteristic being sensed;
    a second sensor configured to sense a characteristic of the part on a build structure of the additive manufacturing system, the second sensor outputting a second electronic signal that includes electric voltage or current levels or digital data values which vary according to the characteristic being sensed; and
    a computing device including a processing element that is programmed or configured to
        receive the first and second electronic signals,
        determine an input force from the laser beam as a function of frequency from the first electronic signal,
        determine an acceleration of the build structure as a function of frequency from the second electronic signal, and
        determine a frequency dependent response function from the input force from the laser beam and the acceleration of the build structure.

2. The system of claim 1, wherein the first sensor is positioned in a build chamber of the additive manufacturing system and is configured to sense an optical characteristic of the laser beam as the laser beam excites the part.

3. The system of claim 1, wherein the first sensor senses an electrical characteristic from an electric power supply supplying electric power to the laser source.

4. The system of claim 1, wherein the second sensor is positioned in contact with the build structure and is configured to sense motion of the build structure as the laser beam excites the part.

5. The system of claim 1, wherein the processing element of the computing device is further programmed or configured to determine a response of the build structure as a function of frequency from the second electronic signal.

6. The system of claim 1, wherein the processing element of the computing device is further programmed or configured to calculate the response function as a function of frequency from the equation: $RF(f)=a(f)/IF(f)$, wherein $a(f)$ is the acceleration of the build structure as a function of frequency and $IF(f)$ is the input force from the laser beam as a function of frequency.

7. A system for determination of a quality of a part being built using a laser-based additive manufacturing system, the system comprising:
    a laser source configured to generate a laser beam with excitation properties;
    a first sensor configured to sense a characteristic of the laser beam or the laser source, the first sensor outputting a first electronic signal that includes electric voltage or current levels or digital data values which vary according to the characteristic being sensed;

a second sensor configured to sense a characteristic of the part on a build structure of the additive manufacturing system, the second sensor outputting a second electronic signal that includes electric voltage or current levels or digital data values which vary according to the characteristic being sensed; and a computing device including a processing element that is programmed or configured to
receive the first and second electronic signals,
determine an input force from the laser beam as a function of frequency from the first electronic signal,
determine an acceleration of the build structure as a function of frequency from the second electronic signal, and
determine a frequency dependent response function from the input force from the laser beam and the acceleration of the build structure.

8. The system of claim 7, wherein the first sensor is positioned in a build chamber of the additive manufacturing system and is configured to sense an optical characteristic of the laser beam as the laser beam excites the part.

9. The system of claim 7, wherein the first sensor senses an electrical characteristic from an electric power supply supplying electric power to the laser source.

10. The system of claim 7, wherein the second sensor is positioned in contact with the build structure and is configured to sense motion of the build structure as the laser beam excites the part.

11. The system of claim 7, wherein the processing element of the computing device is further programmed or configured to determine a response of the build structure as a function of frequency from the second electronic signal.

12. The system of claim 7, wherein the processing element of the computing device is further programmed or configured to calculate the response function as a function of frequency from the equation: $RF(f)=a(f)/IF(f)$, wherein $a(f)$ is the acceleration of the build structure as a function of frequency and $IF(f)$ is the input force from the laser beam as a function of frequency.

13. A method for determination of a quality of a part being built using a laser-based additive manufacturing system, the method comprising:
generating a laser beam with excitation properties to strike a part on a build structure and generate a response in the part;
measuring a first characteristic of the laser beam or a laser source generating the laser beam;
measuring a second characteristic of the part on the build structure;
determining the first characteristic as a function of frequency, wherein the first characteristic is an input force from the laser beam;
determining the second characteristic as a function of frequency, wherein the second characteristic is an acceleration of the build structure; and
determining a frequency dependent response function from the first characteristic and the second characteristic.

14. The method of claim 13, wherein the first characteristic is measured by a first sensor positioned in a build chamber of the additive manufacturing system and configured to measure an optical characteristic of the laser beam as the laser beam excites the part.

15. The method of claim 13, wherein the first characteristic is measured by a first sensor configured to measure an electrical characteristic from an electric power supply supplying electric power to the laser source.

16. The method of claim 13, wherein the second characteristic is measured by a second sensor positioned in contact with the build plate and configured to measure motion of the build plate as the laser beam excites the part.

* * * * *